United States Patent Office

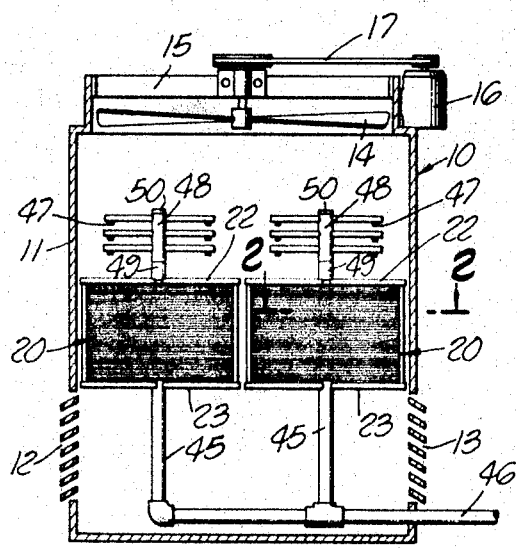
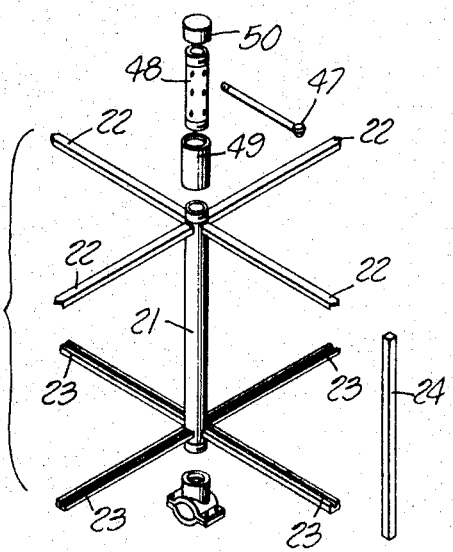
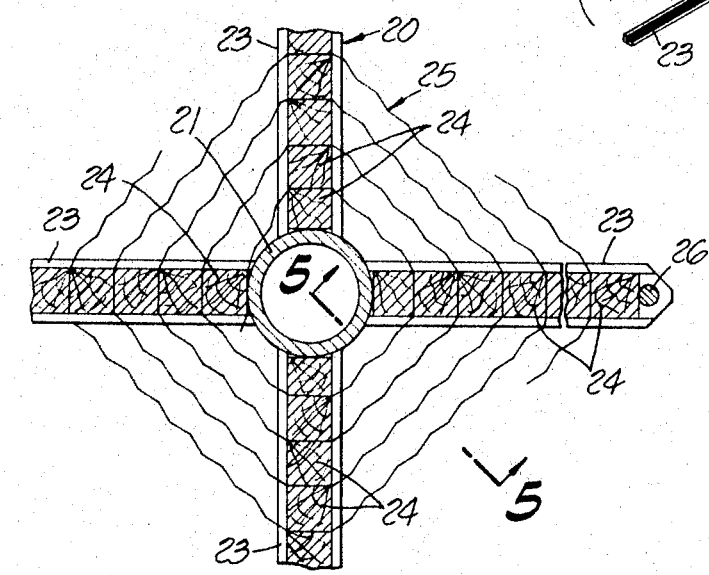

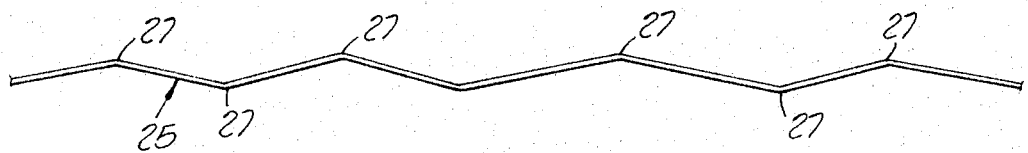
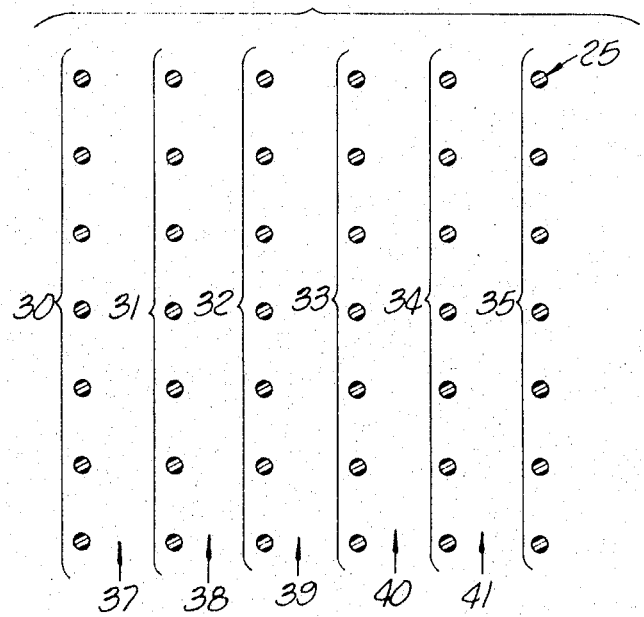
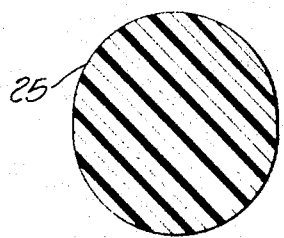
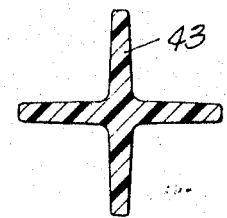

3,463,463
Patented Aug. 26, 1969

3,463,463
MASS TRANSFER DEVICE FOR CONTACTING A LIQUID WITH A GAS
Diven Meredith, 87-135 Ave. 56,
Thermal, Calif. 92274
Filed Mar. 14, 1968, Ser. No. 713,070
Int. Cl. F28c 1/02
U.S. Cl. 261—24                                    12 Claims

ABSTRACT OF THE DISCLOSURE

A series of substantially horizontal tensioned filaments in a vertical plane is provided and each of the filaments is crimped in zig-zag fashion to form offset prominences along its length. A plurality of such series of filaments are laterally spaced so that their respective vertical planes are parallel.

---

This invention relates to a new and improved form of mass transfer device for contacting a liquid with a gas, and will be described in connection with apparatus for contacting water and air, although this is by way of example, and not of limitation.

This invention relates to improvements over the device shown in my Patent No. 3,318,586 granted May 9, 1967. More particularly, this invention relates to a new and improved form of "packing," a term used to describe a device for accomplishing direct and intimate contact between a flowing liquid and a flowing gas, in order to effect required interaction, primarily in the form of convective mass transfer, although other uses such as chemical reaction, mixing of fluids, and heat transfer are also of importance. The technology of mass transfer encompasses the transfer of latent and sensible heat, and of diffusion of one mass into another, following well-known physical laws, by direct contact of liquid and gas.

Common uses of apparatus incorporating packing for contacting liquids and gases are for heating, cooling, humidifying, drying, absorbing, condensing, fractionating, chemical reacting, mixing, and scrubbing. Such apparatus are known as heat exchangers, humidifiers, evaporative coolers, cooling towers, scrubbers, fractionating towers, contactors, reactors, trickling filters, adiabatic coolers, and air washers.

It is known that for a given overall height, packing performance is improved as the packing layers are reduced in height. This results from the larger number of "leading edges" at which new boundary layers develop between the liquid and the gas. In the regions where the boundary layer is developing, mass transfer rates are highest, thereby resulting in better utilization of surface in a smaller packing volume to perform a given task, at essentially an equal utilization of flow energy.

Since the elements of the packing must necessarily have some finite thickness, there must necessarily be some frictional resistance to flowing fluids. The thicker that the packing element is in relation to its length, the greater is the "form drag" relative to the skin friction, thereby causing an increase in flow energy required to perform a given task. Form drag is also influenced by the shape of the element as well as its thickness relative to its length.

Greater compactness of a packing, without increase in required flow energy to perform a given task, can be obtained by reduction in passage size between the elements. The limiting practical condition is reached when liquid drainage through the packing is impeded by viscosity and surface tension effects, which result in liquid "holdup."

Also the performance of a packing is increased if the elements thereof are caused to vibrate, flutter or rapidly oscillate, with respect to the flowing fluids. The excitation may be self induced, as illustrated by a taut wire in a moving air stream.

It can therefore be concluded that a desirable form of packing will have the largest number of leading edges and of the least thickness, forming the least size of flow passages for gas commensurate with the hydraulic limits of the flowing fluids, operating in a counterflow aspect, with vibration or oscillation of the elements. The hydraulic limits of the flowing fluids are a function of their temperatures, viscosity, surface tension, density, flow velocity, etc., and therefore the dimensions of a "best" form of packing for one set of hydraulic limits would not necessarily have the same dimensions for another set of hydraulic limits.

Other desired features of an optimum form of packing, which features are essential to the continued maintenance of the level of performance, are: (a) freedom from fouling, plugging and blocking of the flow passages, as may be caused by adherence to and lodgment of foreign elements, debris, and detritus onto and within the packing volume, (b) materials which are resistant to stresses and strains, and to erosive and corrosive action of flowing fluids and incidental agents associated therewith. More specifically, the material should be resistant to rotting or attack by bacteria, fungus or other living organisms, resistant to fatiguing due to repeated flexing as caused by vibration, flutter and repeated deflections, resistant to plastic flow such as could be induced by constant stress applied over a long period of time, resistant to abrasion and wear as caused by constant physical contact with flowing fluids, resistant to strains as may be imposed by high tensile and compressive stresses, resistant to chemical attack and solvent action of the flowing fluids and supplementary agents associated therewith, resistant to deterioration by the action of the various wavelengths of light and radiation, and resistant to extremes of temperature. It is highly desirable to achieve a high liquid mass rate and a low gas pressure drop.

In accordance with my invention, the foregoing objects and advantages are achieved by employing several series of filaments, each series comprising vertically spaced horizontal tensioned filaments in the same vertical plane. This provides the maximum number of leading edges of the least transverse dimensions, forming the smallest size of gas flow passages, permitting of counterflow operation with self-induced vibration of the filaments. Moreover, an important feature of this invention resides in the shape of the filaments which are crimped in zig-zag fashion to provide a series of angularly related segments connected end-to-end. This crimping produces offset prominences along the length of each filament and produces an elastic effect which overcomes any sag characteristic of packings made with straight filaments and provides more uniform distribution and break-up of the liquid. The offset prominences provide a great many points where the liquid accumulates into droplets along the length of each filament, the droplets then descending by gravity to the next lower filament. It has been determined that packings made of crimped filaments have markedly superior performances, as compared with packings made with straight filaments.

In the drawings:

FIGURE 1 is a side elevation partly in section showing an air humidifier device embodying this invention.

FIGURE 2 is a sectional plan view partly broken away taken substantially on the lines 2—2 as shown in FIGURE 1.

FIGURE 3 is a perspective view of the structural parts used for one of the filament packing assemblies.

FIGURE 4 shows one of the filaments which is crimped in zig-zag fashion.

FIGURE 5 is a sectional view taken substantially on the lines 5—5 as shown in FIGURE 2.

FIGURE 6 shows a cross-section of one of the filaments on a large scale.

FIGURE 7 shows a cross-section of a modified form of filament.

Referring to the drawings, the humidifier device generally designated 10 comprises a housing 11 having air inlet openings 12 and 13 near the bottom of the housing. The air is drawn through the housing by a fan 14 adjacent to outlet opening 15. The fan is driven by means of a motor 16 and belt 17. Positioned within the housing 11 and substantially filling a portion of the interior thereof, are a plurality of packing devices generally designated 20. Very little clearance space is left between the packing devices and the interior of the housing 11, so that substantially all of the air must pass upward through the packing devices 20.

As shown in the drawings, each packing device 20 includes a central upright tubular member 21 having a first set of radial support ribs 22 and a second axially spaced set of radial support ribs 23. The ribs 22 have a downward facing groove and the ribs 23 have an upward facing groove. Axially extending spacers 24 have their upper ends received in the grooved ribs 22 and their lower ends received in the grooved ribs 23. Crimped filaments 25 are then clamped between one of the spacer bars 24 and the outer surface of the tubular member 21. The filaments are then wrapped under tension around additional spacers 24 which contact the outer surface of the member 21. Additional spacers 24 are inserted into the grooved ribs 22 and 23 as the wrapping continues, so that the filaments 25 are clamped between pairs of spacers 24, as shown in FIGURE 2. The tension of the filaments holds each of the spacers under compression. When all of the spacers 24 have been added, the outer ends of the filaments are fastened to an outermost spacer, by any convenient means. A vertical retainer bar 26 may then be mounted at the outer ends of the ribs, as shown in FIGURE 2. This particular form of packing assembly 20 is generally square in outline, although other shapes may be used if desired. Each filament extends in a continuous spiral path, with its inner end fixed to the central tubular member 21, and its outer end fixed to an outermost spacer 24.

In a typical packing assembly of this type comprising a square about 13 inches on a side and about 12 inches high, about 60 separate continuous filament strands are employed. In the same typical example, each filament is formed of polypropylene and is generally circular in cross-section, although one dimension may be slightly greater than another, as shown in FIGURE 6. This slight elongation is a characteristic of the process by which the polypropylene filaments are formed, and is not important in the use of the filaments in connection with this invention. In this same typical example, the zig-zag crimping, as shown in FIGURE 4, produces offset prominences 27, about six per linear inch. The prominences 27 extend laterally for a distance on the same order of magnitude as the diameter of the filament.

As best shown in FIGURE 5, the filaments 25 extend in space under tension and are arranged in a plurality of layers or groups 30, 31, 32, 33, 34, 35, etc., each group comprising a series of substantially horizontal filaments. The filaments in each group are disposed in spaced relation one above another in a substantially vertical plane, so that water may drip downward from one filament to the next. The spaces between the laterally spaced groups define vertical passageways 37, 38, 39, 40, 41, etc. for upward flow of air.

The modified form of filament 43 as shown in FIGURE 7 has a cross-section in the shape of an X and therefore has a relatively large exposed surface area. This modified form of filament 43 is also crimped at intervals along its length, as shown in FIGURE 4. It is preferably formed of polypropylene.

While in the particular illustrative example described above, the filaments are formed of polypropylene, other filament materials may be used, for example, stainless steel, Monel, or titanium wire.

The packing assemblies 20 may be mounted at the desired height within the casing 11 on hollow posts 45 connected to the lower ends of the tubular members 21. These posts 45 are in turn connected to a pipe 46 through which water is introduced under pressure. The water is carried up through the posts 45, tubular member 21, and is discharged through a plurality of spray nozzles 47 radiating from a tube 48 carried on extension pipes 49 fixed to the upper end of the tubular members 21. A cap 50 closes the upper end of each tube 48. Water from the nozzles 47 is distributed as uniformly as possible over the upper ends of the packing assemblies 20. Any water accumulating in the lower end of the casing 11 is recirculated, by means not shown.

In the particular example set forth above, it has been found advantageous to maintain the air speed at less than 300 feet per minute. The filament density should not exceed 6,000 linear feet per cubic foot. The groups of filaments, 30, 31, 32, 33, 34, 35, etc., are preferably spaced laterally for a distance greater than the vertical spacing of the horizontal filaments 25.

Having fully described my invention, it is to be understood that I am not to be limited to the details herein set forth but that my invention is of the full scope of the appended claims.

I claim:

1. A mass transfer device for contacting a liquid with a gas, comprising: a series of substantially horizontal tensioned filaments unconnected over the major portion of their length and disposed in spaced relation one above another in a substantially vertical plane, so that liquid may drip downward from one filament to the next, and each of the filaments being crimped in zig-zag fashion to provide a series of offset prominences along its length.

2. The apparatus of claim 1 in which the filaments are formed of polypropylene.

3. The apparatus of claim 1 in which the filaments are substantially circular in cross-section.

4. The apparatus of claim 1 in which the filaments in cross-section comprise a plurality of arms radiating from a central core.

5. The apparatus of claim 1 in which the vertical spacing between filaments is substantially greater than the maximum cross-section dimension of the filaments.

6. A mass transfer device for contacting a liquid with a gas, comprising: a plurality of groups of tensioned filaments, each group comprising a series of substantially horizontal filaments unconnected over the major portion of their length and disposed in spaced relation one above another in a substantially vertical plane, so that liquid may drip downward from one filament to the next, each of the filaments being crimped in zig-zag fashion to provide a series of offset prominences along its length, and means to space said groups laterally to define vertical passageways between said groups for upward flow of gas therebetween.

7. The apparatus of claim 6 in which the filaments are formed of polypropylene.

8. The apparatus of claim 6 in which the filaments are substantially circular in cross-section.

9. The apparatus of claim 6 in which the filaments in cross-section comprise a plurality of arms radiating from a central core.

10. The apparatus of claim 6 in which the vertical spacing between filaments is substantially greater than the maximum cross-section dimension of the filaments.

11. The apparatus of claim 6 in which the lateral spacing of the groups is greater than the vertical spacing of the filaments.

12. A mass transfer device for contacting a liquid with a gas, comprising: a plurality of groups of tensioned filaments, each group comprising a series of substantially horizontal filaments unconnected over the major portion of their length and disposed in spaced relation one above another in a substantially vertical plane, each of the filaments being crimped in zig-zag fashion to provide a series of angularly related segments connected end-to-end, and means to tension the filaments and to space said groups laterally to define vertical passageways between said groups, means for spraying a liquid onto the upper filaments in each series, so that liquid may drip downward from one filament to the next, and means for causing an upward flow of gas through said passageways.

References Cited

UNITED STATES PATENTS

| | | | |
|---|---|---|---|
| 803,925 | 11/1905 | Ohde | 261—103 |
| 2,490,079 | 12/1949 | Melvill | 261—94 |
| 3,243,170 | 3/1966 | Ellis et al. | 261—94 |

FOREIGN PATENTS

| | | |
|---|---|---|
| 759,887 | 10/1956 | Great Britain. |
| 884,483 | 12/1961 | Great Britain. |

TIM R. MILES, Primary Examiner

U.S. Cl. X.R.

261—111